United States Patent [19]
Jeffries et al.

[11] 3,758,074
[45] Sept. 11, 1973

[54] CAMPER LIFTING SYSTEM AND REMOVABLE JACKS THEREFOR

[76] Inventors: Edward William Jeffries, 151 Hacienda, Arcadia, Calif. 91006; Raymond Elmer Jeffries, Jr., 1831 Alpha Ave., South Pasadena, Calif. 91030

[22] Filed: Aug. 7, 1972

[21] Appl. No.: 278,624

[52] U.S. Cl. .................................. 254/45, 214/515
[51] Int. Cl. .............................................. B60p 1/64
[58] Field of Search ...................... 214/515; 254/45

[56] References Cited
UNITED STATES PATENTS
3,350,063 10/1967 Thurlow, Sr. et al. ................ 254/45
3,275,298 9/1966 Hand .................................... 254/45

*Primary Examiner*—Albert J. Makay
*Attorney*—William H. Pavitt, Jr.

[57] ABSTRACT

Removable jack lifting means for use with a heavy body, such as a camper, and detachably carried on a motor vehicle. A plate with at least one notched vertical web is secured to each corner of the body, manually actuated hydraulic jack having telescoping tubular sections is removably affixed to each such plate by bracket members encircling the outer tubular section and carrying transverse studlike elements which are insertable in the web notches. The tubular sections of each jack may be extended gradually to lift up the corner of the body to which it is removably affixed, until the entire body is elevated to where no further support is provided by the vehicle. The latter may then be driven away. The body may be remounted by reversing the process. This is facilitated by a slow release valve in the hydraulic portion of the jack. By providing a plate with a pair of parallel notched edged extensions for each corner of the body, unpowered telescoping tubular support members may be utilized merely to provide support so that a single powered jack may be moved from corner to corner to accomplish the actual lifting or letting down of the body.

11 Claims, 13 Drawing Figures

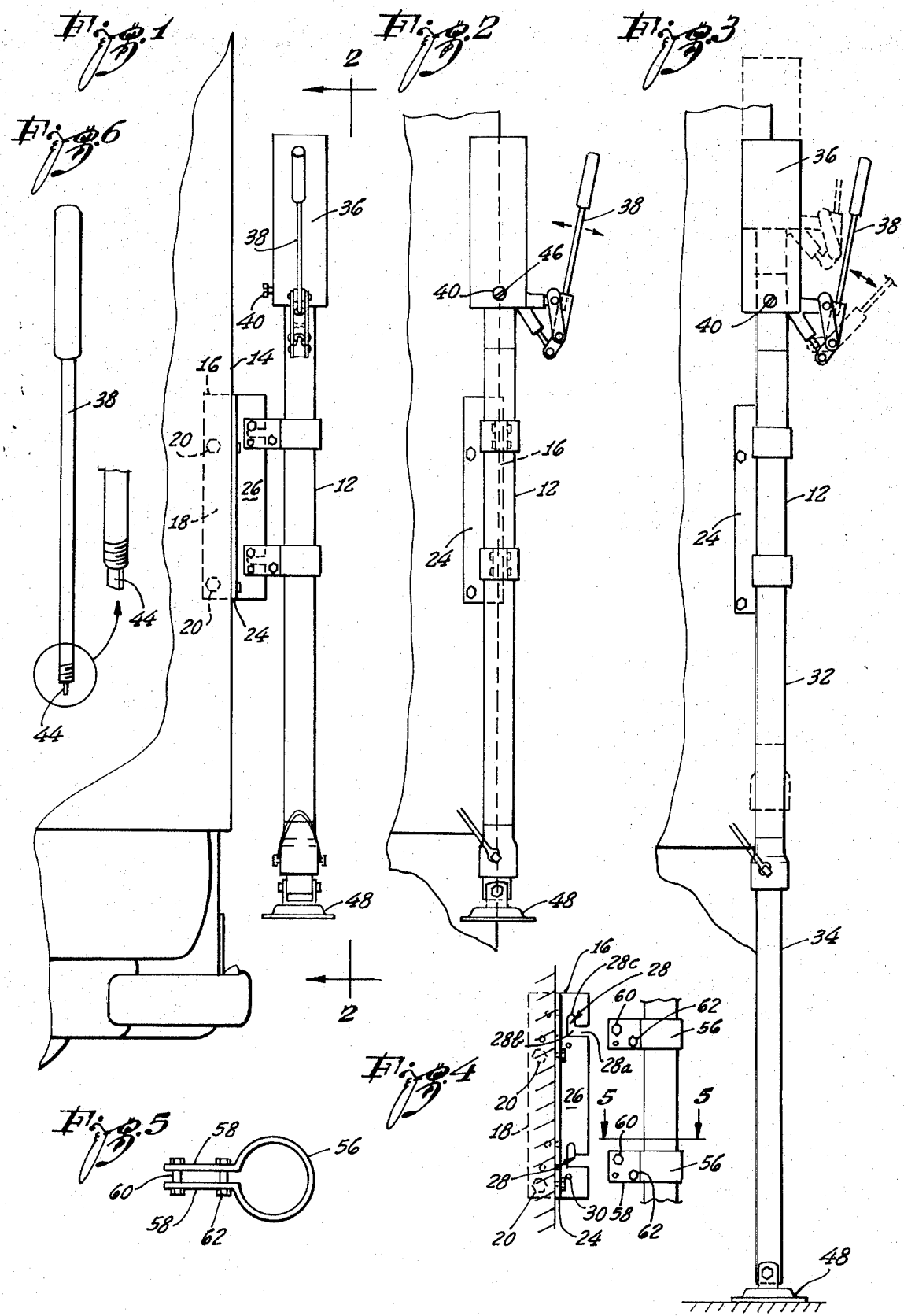

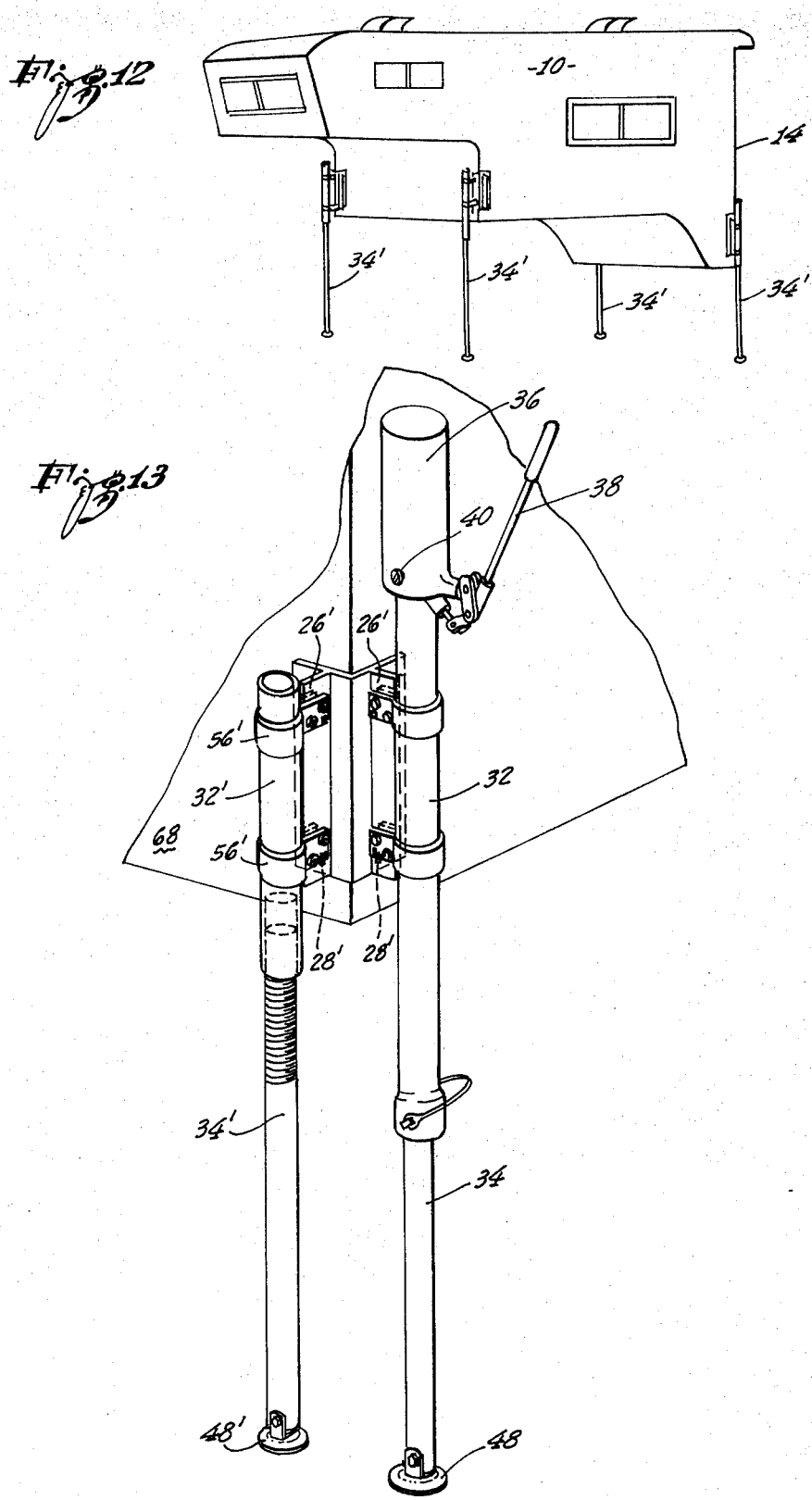

3,758,074

CAMPER LIFTING SYSTEM AND REMOVABLE JACKS THEREFOR

BACKGROUND OF THE INVENTION

1. Field of the Invention

This invention relates to lifting jacks in general and particularly to that type of a jack which is especially adapted for use in removing a camper from the bed of a truck and placing it on the ground, and later replacing it on the truck bed.

2. Description of the Prior Art

In recent years camper bodies of the type which are mountable on truck beds have become increasingly popular. Such camper bodies are quite heavy so that once one is mounted on a truck bed, it is not practically removable therefrom without having some type of powered lifting equipment, such as a crane or jacks. Many camper owners, however, often wish to deposit their campers on the ground at some desired location so that they can use their trucks separately for transportation or hauling. In some instances, the camper owners may actually wish to set up the camper body as a recreational or other temporary residence, and use the truck as a run-about operating from such temporary residence. Additionally, even when camper owners do not wish to remove their camper bodies from the truck beds, they may wish to stabilize them against undesired motion caused by persons walking or moving in the camper, or by wind action against the side of the camper body.

Heretofore, where a camper owner has wanted to remove his camper body from the truck bed for any such or other purpose or to stabilize it against undesired motion, he has had to equip the camper permanently with four fairly large and heavy hydraulic or mechanical jacks, one being permanently secured on each corner of the camper body. When a camper body is so equipped, however, it is inadvisable to take the truck and camper on narrow dirt roads with overhanging brush, or into other areas where brush projects upwardly above the camper wheels. Since the permanently affixed jacks project downwardly from the corners of the camper body, they tend to catch in any such brush. Should the brush be comprised of a heavy branch, it is possible that the jack may even be torn off the corner of the camper body or be badly bent. This could not only result in damage to the latter, but a loss of the jack itself.

Heretofore, such jacks so permanently affixed to camper bodies have been relatively expensive, that is, of the order of $100.00 apiece. Any loss of a jack, therefore, represents a loss of a substantial investment in the owner's recreational or business equipment.

In addition to the possibility of having a jack torn off the corner of a camper during travel, it is also possible to have all of such jacks stolen if the camper is left unattended or unoccupied and a thief should come upon it with proper tools. It would be quite desirable, therefore, to have jacks which could be easily removed from, and stored in, the camper when not needed for actual lifting or stabilizing of the camper. Removal of the jacks when not so required, would also do much to improve the aesthetic appearance of the camper when driven on a highway or parked in a residential neighborhood.

Moreover, since, in some situations, jacks are only needed for lifting or dropping the camper body—particularly in camper rental lots—it would also be desirable to have th jacks removable so that one set of jacks could be used for raising and lowering a number of camper bodies. Thus, in a rental lot, it would only be necessary for the owner-operator to have one set of jacks for a whole fleet of campers, unless, of course, a patron should wish to rent a set of jacks as well, to take with him on his trip. In such a case, a set could be specially packed and rented at an additional charge.

In addition, should several parties desire to travel together with their campers, it would only be necessary for them to have one set of jacks. Further, since as pointed out above, the jacks themselves are relatively expensive, it would be quite desirable if a way could be found to decrease the number of jacks which a camper owner might require.

Thus, there are many important reasons for providing for quick removal of the jacks to be employed on a camper, but heretofore no jacks with such a desirable, easy and quick removability have been made and sold or offered for sale.

SUMMARY OF THE INVENTION

In accordance with the present invention, metal plates are provided which may be permanently secured to the sides of a camper body, preferably at the corners thereof. From these plates rigid, vertical jack-supporting webs extend laterally from the plate and the side of the camper body to which the plates are attached. The outer edges of such webs are notched, preferably in at least two locations spaced from each other by a predetermined distance. The innermost area of each notch further is preferably one which includes a portion which is disposed at a level at least slightly above the entrance or mouth of the notch, thereby preventing the jack mounting means from slipping out of the notches when the weight of part of the camper rests upon the jack.

The jack itself is preferably of the hydraulic type having a pair of telescoping members. It is mounted on the notched web by means of a pair of rigid metal bands which are looped about the outer of the telescoping members and secured thereto as by welding. The ends of each metal band are brought out parallel from the loop and are spaced from each other by slightly more than the thickness of the notched webs. Each pair of ends of the metal band may be held in such orientation and spacing by a transverse studlike element of such size as to slide into a notch of one of the webs. Each pair of looped bands is spaced from each other in such a manner that their studlike elements are disposed apart from each other by the predetermined distance between the notches in the web. Thus, when the jack is brought up to the side of the camper, the pair of studlike elements may be slipped into the web notches and the spaced band ends supporting them will slide over the webs themselves, thereby serving to hold the jack in a vertical position. When the jack is operated to extend the innermost of its telescoping tubular members to where it begins to assume support of some of the weight of the corner of the camper, the studlike elements tend to force themselves deeper and into the higher area of the notches to prevent the studs from inadvertently slipping out of the notches. Desirably, registering orifices are provided in both the web and the band ends which fit thereover. By inserting a screw through such registering orifices and securing it with a nut, disengagement of the web and band ends may be further effectively prevented.

When jacks are placed on all four corners of a camper body by the mounting means just described, the camper body may by sufficiently elevated from the truck bed to permit the truck vehicle itself to be driven out from under the camper body. The latter may then either be left on the jacks or dropped gently to the ground by opening a slow release valve provided in each of the jacks.

When it is desired to remount the camper body upon the truck bed, the body is jacked up sufficiently to enable the truck to be backed under the body, whereupon the body may be gently lowered onto the truck bed. After the jacks have been used for either raising or lowering the camper body, and no further body weight is supported upon the jacks, the latter may be taken off their camper mounting plates by simply removing the locking nuts and screws through the registering orifices and then pulling the studlike elements held by the pairs of bands about the jacks, out of the web notches. The jacks may then be stored in the camper itself or they may be used elsewhere.

It is also a feature of the present invention to enable the operation just described to be conducted with but a single hydraulically powered jack and four telescoping support elements; or a fewer number if the camper user is simply trying to stabilize his camper so as to prevent its rocking during use and occupancy. For these purposes the metal plates which are mounted on the camper may have a pair of identical vertical notched webs, set perpendicularly or parallel to each other, and extending laterally from the camper body. As the jacking of any one corner is being accomplished, a telescoping support member may be mounted adjacent the notched web. When the jack is needed for another corner of the camper body, it may be backed down slightly to where the telescoping support member assumes the weight theretofore sustained by the jack and the jack is pulled off its supporting web and moved to the web of the plate on another corner of the camper body. Each telescoping support member preferably comprises a pair of tubular sections which are matingly threaded so that they may be easily screwed relative to each other to effect the desired telescoping. By this means, the expense to a camper owner may be substantially decreased since he would require but one jack and four relatively cheaper telescoping support members, instead of four jacks.

BRIEF DESCRIPTION OF THE DRAWINGS

In the accompanying drawings,

FIG. 1 is an elevation of a jack lifting means attached to the rear end of a camper body in accordance with the present invention.

FIG. 2 is a further elevational view of the jack lifting means looking in the direction of the arrows in FIG. 1.

FIG. 3 is a view similar to FIG. 1, but showing the jack lifting means extended to the ground surface to assume some of the weight of the camper body.

FIG. 4 is a partial view of the web-bracket portion of FIG. 1, showing the bracket removed from engagement with the web.

FIG. 5 is a view of the bracket as seen in the direction of the arrows in FIG. 4.

FIG. 6 is a detail of the crank handle of the jack.

FIG. 12 is a perspective view of a supported camper body using telescoping support elements.

FIG. 13 is a perspective view of a corner of the camper body of FIG. 12 showing a mounting plate with two vertical webs and how a jack lifting means may be employed with a telescoping support member.

DESCRIPTION OF THE PREFERRED EMBODIMENTS

Figure 7:
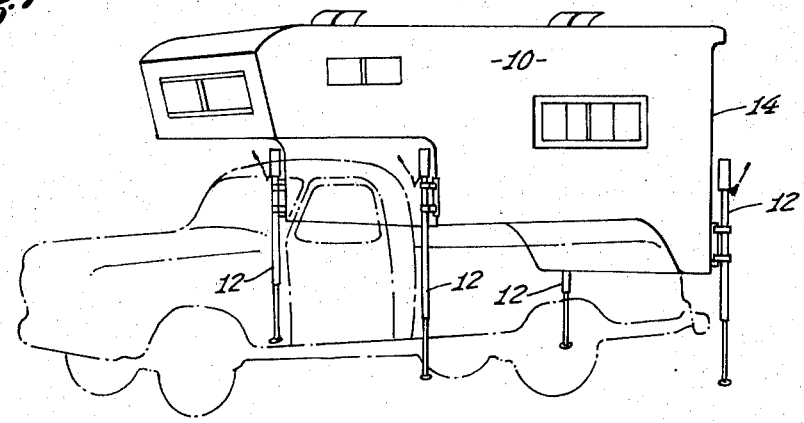
FIG. 7 is a perspective view of a camper truck showing the manner in which the jacks may be mounted in accordance with the present invention.
Figure 8:
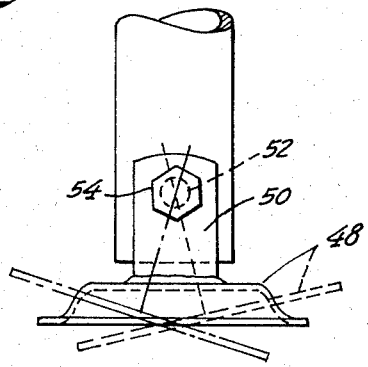
FIG. 8 is a detail of the footing of jacks or other support means.
Figure 9:
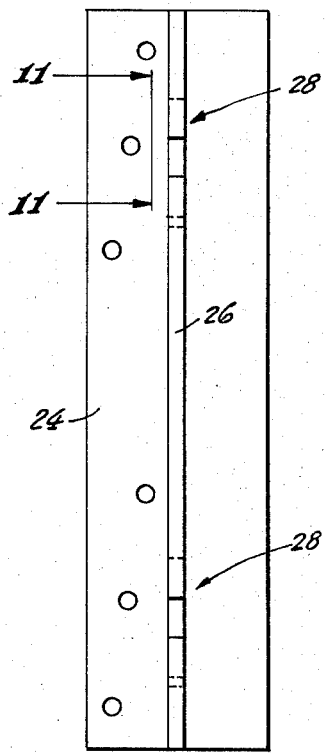
FIG. 9 is a plan view of a camper mounting plate.

The present invention is intended to be employed particularly in the manner shown in FIG. 7, although once its principles of construction and operation are understood from this specification and the accompanying drawings, other applications for the invention will readily occur to those skilled in this art.

Figure 11:
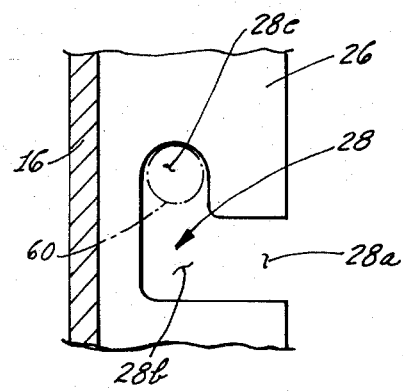
FIG. 11 is a detail of a preferred notching of the web of a plate.
Figure 10:
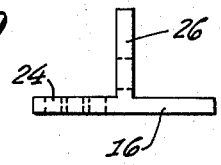
FIG. 10 is an end view of the plate of FIG. 9.

In lieu of providing a set of four hydraulic jacks permanently attached to a camper body 10, in one embodiment of the invention four such jacks 12 may be removably attached to the corners 14 of the body 10 by means of jack supporting plates 16. Each of the plates 16 includes at least one facing section 18 which is orificed at 20 to permit it to be bolted or screwed to one side 22 of the camper body 10. Preferably the plate 16 may include a second facing section 24 which is integral with the section 18 and is disposed at right angles thereto, thereby to be better secured at each corner 14 of the camper body 10. Each plate 16 is further provided with at least one vertical web 26 which extends laterally of the camper body 10 when the plate is mounted on a corner 14 thereof. The web 26 is notched at 28 preferably as shown in FIGS. 1, 4 and 11. Each notch 28 includes an entrance area 28a which may be substantially horizontal, and an inner upwardly recessed area 28b, the upper portion 28c of which is disposed at a level above that of the entrance area 28a. Web 26 may also be provided with orifices 30, the function of which will be later explained.

The jack lifting means 12 may be of the hydraulically actuated tubular telescoping type having an outer member 32 and an inner member 34 which is slidable relative to the outer member. Member 34 is moved in and out of the outer member 32 by hydraulic action accomplished by the handle-actuated head 36, the details of which are not shown nor described since they per se form no part of the present invention. Suffice it to state that when the handle 38 is pumped, the hydraulic head 36 will drive the inner tubular member 34 partway out of the outer member 32 to provide the necessary lifting force. The member 34 will remain in the position to which it is thus extended until a slow release control valve 40 is turned by removing the handle 38 from the pump socket 42 and inserting its bladed tip 44 into the slot 46 of the control valve 40, and rotating the slotted valve 40 in a counterclockwise direction; whereupon, the inner member 34 will be forced up and back into retracted telescoping engagement with the outer member 32 by the weight which the jack 12 is then sustaining. Further pumping of the handle 38 will cause additional retraction of member 34 into the outer member 32.

The lower extremity of the member 34 is provided with a pivotable foot plate 48. This latter plate may be of the configuration shown in FIGS. 1, 2, 3 and 8 with an integral upwardly extending element 50 transversely orificed at 52. Element 50 is pivotally secured outside the lowermost open end 34a of the member 34 by a pin 54.

The outer tubular member 32 of each jack 12 carries a pair of rigid metal bands 56 which are looped about the member 32 and secured thereto permanently as of welding. Each band 56 includes a pair of parallel flat ends 58 which extend perpendicularly from the member 32 and are spaced from each other by a distance slightly greater than the thickness of the vertical web 26. These ends 58 are held in such spaced relationship by studlike elements 60 and 62 which extend perpendicularly through both of the ends 58, and may be welded thereto. An orifice 63 may be provided in each band 58 to register with orifice 30 when the band ends 58 are forced over the web 26. Each of the pair of bands 56 is so spaced from each other on the member 32 that the studlike elements 60 are disposed from each other by the same distance as the notches on the web 26 are separated from each other. The elements 62 may be disposed close to the curved portions 64 of the bands 56.

The jack 12 may be further secured to the web 26 by passing through registering orifices 30 and 63 another stud 65 with a threaded end onto which may be screwed a wing (not shown).

Thereby the jack 12 may be removably mounted on the corners of the camper body 10. Thus, each jack 12 is held vertically so that its studs 60 may be brought into register with the notches 28 in the web 26 and then the jack 12 is pushed horizontally to cause the studlike elements 60 to move into the notches 28. As soon as the handle 38 of the hydraulic pump head 36 is pumped to force the inner tubular member 34 out of the outer member 32 down to where some of the weight of the camper body 10 is assumed by the jack, the elements 60 will be forced into the upper recessed areas 28c of notches 28, thereby to prevent the elements 60 from slipping horizontally out of the notches 28 and the jack 12 from moving away from the corner 14 of the camper body.

Each of the four jacks 12 disposed on a corner 14 of the camper body 10 may be pumped to where it assumes enough of the weight of the body to permit the truck 66 on which it has been mounted to be driven out from under the body 10. If it is desired to let the body down to the ground, the jack handle 38 may be unscrewed from the pump socket 42 and its blade 44 is inserted in the slot 46 of the slow release valve 40 and turned. As the hydraulic fluid is bled from one chamber to another (not shown) in the pump, the weight supported on the inner member 34 gradually forces the member 34 back up into the inner member 32 until no further force is thereby applied to the member 34. Pumping of the handle 38 in the socket 42 will now retract the member 34 even further to where the elements 60 drop down out of the areas 28c in the notches 28 so that they can be pulled out of the latter horizontally. Thereby the jack 12 may be removed from its mounting on the vertical web 26.

In the embodiment of the invention shown in FIGS. 12 and 13, a single hydraulic jack is employed in conjunction with a plurality (preferably four) of non-hydraulic telescoping support elements 68. For this removable jacking system, each mounting plate 16' is provided with a pair of parallel vertical webs 26' integrally formed with the plate 16'. Each web 26' may be identical to the notched web 26 heretofore described. The webs 26' are spaced from each other sufficiently to permit a jack 12 to be mounted on a web 26' simultaneously with a support element 68. The latter simply comprises a pair of tubular members 32', 34', which are of sufficiently different inner and outer diameters respectively, and matingly threaded to permit the inner member 34' to be screwed telescopically in and out of the outer member 32. Footing 48' may be provided at the lower end of member 34' just as it is provided at the end of member 34 of the jack 12. The outer member 32' also carries a pair of bands 56' which may be substantially similar to bands 56 on member 32.

It will be seen, then, from FIGS. 12 and 13, that a single hydraulic jack 12 may be employed to lift and lower a camper body, in conjunction with preferably four telescoping support elements 68. The actual raising and lowering of each corner 14 of the camper body is accomplished by the single hydraulic jack 12. As soon as the desired level of a camper body corner is attained with the jack 12, the height of the telescoping member is set accordingly; the jack 12 is then raised slightly more; the member 68 is mounted on the other parallel web 26'; the jack 12 is lowered below the height set for the member 68 so that it sustains no weight of the camper body 10, but all support is provided by the member 68; whereupon the jack 12 may be pulled from its web 26' and taken to another corner 14 of the camper or used elsewhere.

The present invention with its demountable jack and supporting member system attains the desirable objectives which have not heretofore been possible with the permanently attached camper jacks.

We claim:

1. For use in elevating and lowering a heavy body, said body being removably mounted upon a vehicle above the ground surface upon which such vehicle operates, and said body further having portions which extend horizontally at least to the edges of the sides of said vehicle; removable jack lifting means to elevate said body and supportingly to assume at least a portion of the weight of said body, and to enable said body to be lowered, said means comprising:

A. A plurality of jack supporting plates disposed around the sides of said body, each of said plates being secured to one of the body sides and having a rigid vertical web protruding laterally from said body, each said web being provided with a pair of parallel notches spaced from each other by a predetermined distance, each said notch extending inwardly from the outer entrance opening at the outer edge of the web;

B. A plurality of jacks, each of said jacks including inner and outer tubular members which are telescopable and extendable with respect to each other, power and valve means for effecting such extension and telescoping, the outer of said telescoping members being provided with a pair of laterally extending parallel bracket elements secured about said outer member, each of said elements having secured thereto in its lateral extension thereof, a transverse stud, each said stud being of such diameter as to fit slidably in one of the notches in said web, and the studs of each pair of bracket elements being disposed parallel to, and spaced from each other by said predetermined distance between each pair of notches in said web;

Whereby each said jack may be removably attached to one of said jack supporting plates by pressing the studs into the notches in the web to where they are disposed therein; each jack is then operated by its power means to extend its inner telescoped member to said ground surface; whereupon, with further powered extension of the latter member, the side of the body to which the jack supporting plate is attached is elevated with respect to portion of the vehicle upon which such body side is supportedly mounted; and conversely, upon telescoping the inner member into the outer member to where it does not touch the ground surface, the jack may be removed from the supporting web.

2. The jack lifting means as described in claim 1, wherein the body which said means is designed to elevate is a rectangular camper.

3. The jack lifting means as described in claim 2, wherein each jack supporting plate is provided with a further vertical plate which is perpendicular to said jack supporting plate, whereby the latter may be more securely attached to the corner of a camper body.

4. The jack lifting means as described in claim 1, wherein the extremity of the inner telescoping member which extremity contacts the ground surface is provided with a pivotably secured foot, whereby said means may receive the fullest support from the ground surface despite any irregularities in the latter.

5. The jack lifting means as described in claim 1, wherein the power means for causing the extension and telescoping of the tubular members ia a manually actuable hydraulic pump, attached to the top of the outer tubular member, said pump being operable by a hand pumping lever.

6. The jack lifting means as described in claim 5, wherein said pump is provided with a valve, said valve having an elevating position and a slow release lowering position, thereby to permit the members to telescope slowly and controllably when the valve is set in its release position.

7. The jack lifting means as described in claim 1, wherein each bracket element is comprised of a rigid metal band looped about the outside tubular member and secured thereto to prevent sliding relative to such member, the ends of said metal band extending perpendicularly from said member and being secured in spaced parallel relationship to each other by very slightly greater distance than the width of the notched web and the transverse stud extends between said ends and is secured thereto.

8. The jack lifting means as described in claim 7, wherein the ends of the rigid metal band of each bracket are secured in spaced relationship to each other by additional stud means.

9. The jack lifting means as described in claim 7, wherein both of each jack supporting plate web and the ends of each metal band are provided with orifices which register when said ends are pushed into engagement with said web, whereby the brackets and webs may be secured against disengagement by passing through the registering orifices a screw type stud and fastening the same by means of a nut.

10. The jack lifting means as described in claim 1, wherein the innermost area of each notch includes a recessed portion at a level above the entrance opening, thereby to prevent the studlike elements of the jack from inadvertently slipping out of the notches.

11. For use in elevating and lowering a heavy body, said body being removably mounted upon a vehicle above the ground surface upon which such vehicle operates and said body further having portions which extend horizontally at least to the edges of the sides of said vehicle, a jack and support system, said system comprising:

A. A plurality of plates secured at predetermined locations about the sides of said body, each of said plates having a plurality of vertical webs protruding laterally from said plate and said body, and said webs being spaced from each other, each said web being provided with a pair of parallel notches spaced vertically from each other by a predetermined distance, each said notch extending from an entrance opening at the outer edge of the web inwardly toward the plate;

B. A plurality of telescoping vertical support elements, each of said elements being comprised of inner and outer tubular members which are telescopable and extendable with respect to each other by manual adjustment and when adjusted to any position, remain in such position until further manually adjusted, each of said elements being provided with a pair of laterally extending parallel bracket elements secured about said outer member, each of said bracket elements having secured thereto in its lateral extension thereof, a transverse stud, each said stud being of such diameter as to fit slidably in one of the notches in one of said webs, and the studs of each pair of bracket elements being disposed parallel to, and being spaced from each other by said predetermined distance between each pair of notches in said web; and C. At least one jack, said jack including inner and outer tubular members which are telescopable with respect to each other, power and valve means for effecting such extension and telescoping, and the outer of said telescoping members being provided with a pair of laterally extending parallel bracket elements similar to those bracket elements provided each vertical support element, and similarly secured to the outer tubular member of the said jack;

Whereby said body may be elevated by first attaching the jack to the body by means of its bracket-held transverse stud members which are insertable in the notches in a web; extending the jack tubular members to a point slightly above the desired level of elevation; attaching an extended tubular support member to the body by its bracket-held transverse stud members being inserted in another web in the same plate as the web to which the jack is attached; and after attaching the tubular support member, lowering and removing the jack so that the telescoping tubular support member sustains the weight theretofore sustained by the jack; and repeating the process at each other supporting plate location with an additional telescoping tubular support member.

* * * * *